United States Patent
Jin et al.

(10) Patent No.: US 10,771,109 B1
(45) Date of Patent: Sep. 8, 2020

(54) HYBRID ACTIVE TAP

(71) Applicant: Cisco Technology, Inc., San Jose, CA (US)

(72) Inventors: Hang Jin, Plano, TX (US); John T. Chapman, Orange, CA (US)

(73) Assignee: Cisco Technology, Inc., San Jose, CA (US)

(*) Notice: Subject to any disclaimer, the term of this patent is extended or adjusted under 35 U.S.C. 154(b) by 15 days.

(21) Appl. No.: 16/281,769

(22) Filed: Feb. 21, 2019

(51) Int. Cl.
   *H04B 3/38* (2006.01)
   *H04B 10/69* (2013.01)
   *H04B 10/29* (2013.01)
   *H04B 3/08* (2006.01)

(52) U.S. Cl.
   CPC ........... *H04B 3/38* (2013.01); *H04B 3/08* (2013.01); *H04B 10/29* (2013.01); *H04B 10/6971* (2013.01)

(58) Field of Classification Search
   CPC . H04B 3/38; H04B 3/08; H04B 10/29; H04B 10/6971
   See application file for complete search history.

(56) References Cited

U.S. PATENT DOCUMENTS

| | | | |
|---|---|---|---|
| 2015/0207525 A1* | 7/2015 | Li | H04N 7/17309 370/297 |
| 2017/0310541 A1* | 10/2017 | Jin | H04L 41/147 |
| 2019/0296791 A1* | 9/2019 | Walley | H04B 3/20 |
| 2019/0320134 A1* | 10/2019 | Barany | H01P 1/213 |
| 2020/0106530 A1* | 4/2020 | Campos | H04L 12/2878 |
| 2020/0127732 A1* | 4/2020 | Krapp | H04B 10/038 |

* cited by examiner

*Primary Examiner* — Andrew Lai
*Assistant Examiner* — Harry H Kim
(74) *Attorney, Agent, or Firm* — Merchant & Gould P.C.

(57) ABSTRACT

A hybrid active tap may be provided. The hybrid active tap may comprise a first branch and a second branch. The first branch may be disposed between a first diplexer and a second diplexer. The first branch may correspond to a first frequency spectrum. The second branch may be disposed between the first diplexer and the second diplexer. The second branch may correspond to a second frequency spectrum. The hybrid active tap may further comprise a third branch, a fourth branch, a splitter, and an amplification device. The third branch may be disposed between a first coupler and a third diplexer. The first coupler may be coupled to the first branch. The fourth branch may be disposed between a second coupler and the third diplexer. The second coupler may be coupled to the second branch. The splitter may be connected to the third diplexer and the amplification device may be disposed in the first branch.

20 Claims, 12 Drawing Sheets

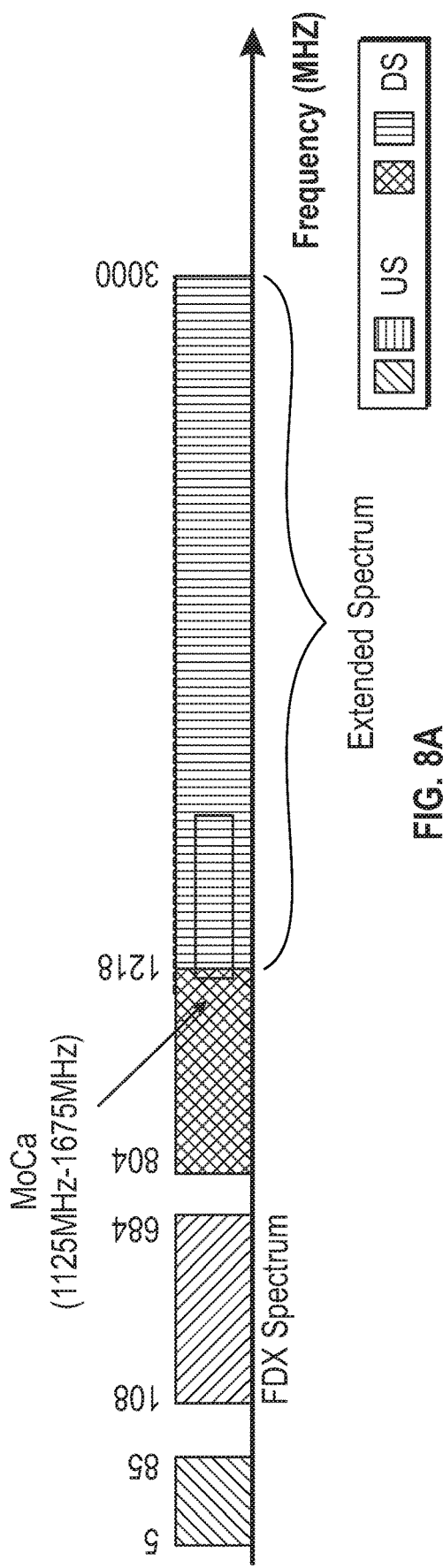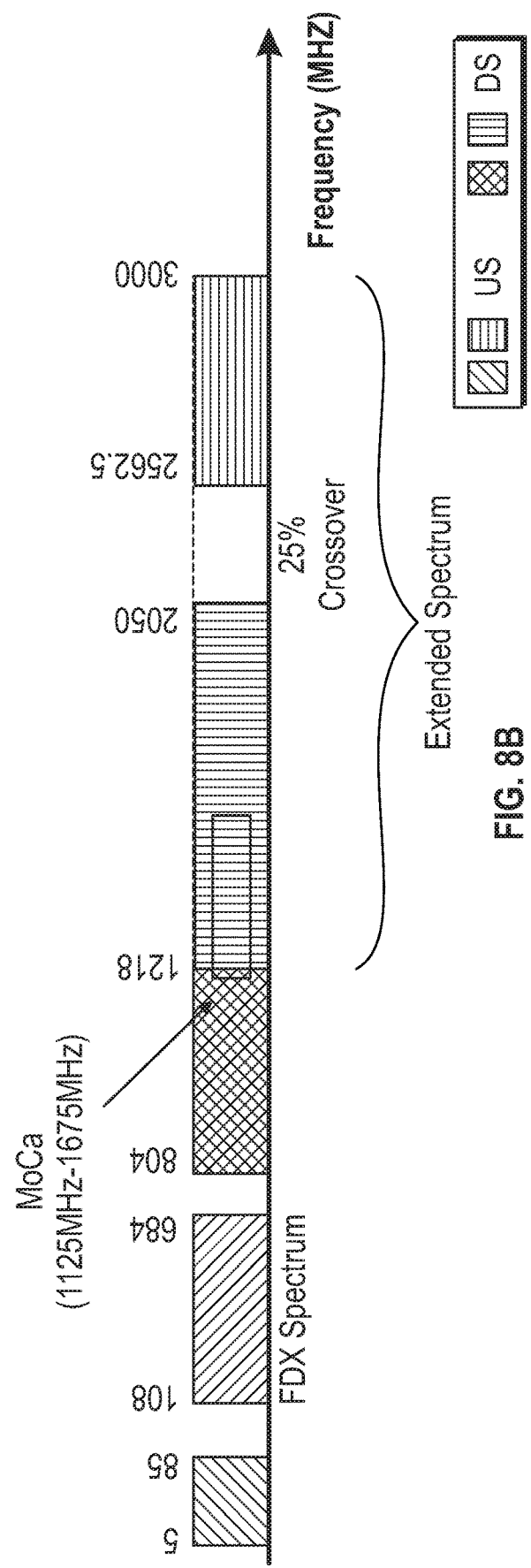
FIG. 8A
FIG. 8B

Comparison on AC Power for 200HHP (N+2)

| | Legacy System (108MHz-1218MHz) | Legacy Spectrum (108-684MHz) | Extended Spectrum (804MHz-3GHz) Case 1 (1 Active per 4 Taps) | Extended Spectrum (804MHz-3GHz) Case 2 (1 Active per 3 Taps) |
|---|---|---|---|---|
| HHP per Node= | 200 | 200 | 200 | 200 |
| HHP per Tap= | 2.4 | 2.4 | 2.4 | 2.4 |
| Total Number of Taps= | 84 | 84 | 84 | 84 |
| Number of Taps Between Amp= | 8 | 8 | 4 | 3 |
| Total Number of Active Tap(Amp)= | 11 | 11 | 21 | 28 |
| RF Output Power of Active Tap(Amp)= | 76.79 dBmV | 71.84 dBmV | 72.44 dBmV | 63.06 dBmV |
| Minimum CM Received Signal Level= | -5.5 dBmV | -5.3 dBmV | -6.8 dBmV | -5 dBmV |
| AC-> RF Power Conversion Efficiency= | 3% | 3% | 3% | 3% |
| AC Power of Active Tap(Amp)= | 21.23W | 6.79W | 7.8W | 0.9W |
| Total AC Power= | 254.76W | 81.48W | 171.6W | 26.1W |

| | |
|---|---|
| Legacy System (108MHz - 1218MHz) | 254.76W |
| Extended Spectrum (108MHz-684MHz + 804MHz-3GHz Case 1) | 253.08W |
| Extended Spectrum (108MHz-684MHz + 804MHz-3GHz Case 1) | 107.58W |

FIG. 11

HYBRID ACTIVE TAP

TECHNICAL FIELD

The present disclosure relates generally to extending operation frequencies.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings:

FIGS. 8A and 8B illustrate extended frequencies with Downstream (DS) and Upstream (US) spectrum partition;

FIG. 11 illustrates a comparison on Alternating Current (AC) power for 200 HHP (N+2)

DETAILED DESCRIPTION

Overview

Figure 1A:
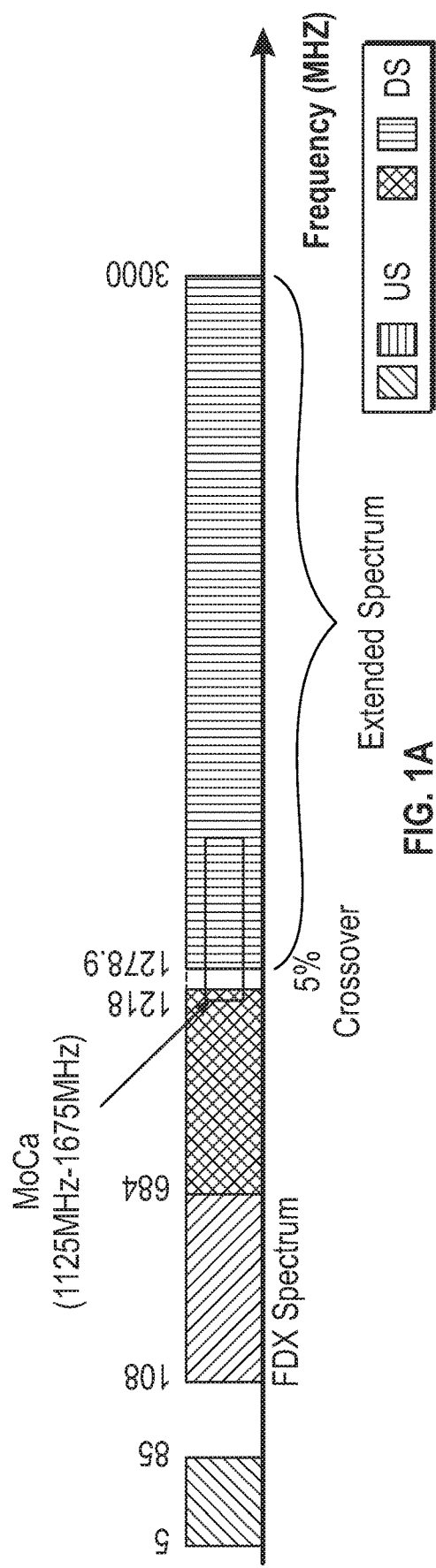
FIGS. 1A and 1B illustrate extended frequencies with Downstream (DS) and Upstream (US) spectrum partition.

A hybrid active tap may be provided. The hybrid active tap may comprise a first branch and a second branch. The first branch may be disposed between a first diplexer and a second diplexer. The first branch may correspond to a first frequency spectrum. The second branch may be disposed between the first diplexer and the second diplexer. The second branch may correspond to a second frequency spectrum. The hybrid active tap may further comprise a third branch, a fourth branch, a splitter, and an amplification device. The third branch may be disposed between a first coupler and a third diplexer. The first coupler may be coupled to the first branch. The fourth branch may be disposed between a second coupler and the third diplexer. The second coupler may be coupled to the second branch. The splitter may be connected to the third diplexer and the amplification device may be disposed in the first branch.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems that provide content from a headend. The headend may comprise, but is not limited to, a cable television headend that may comprise a master facility for receiving television signals for processing and distribution over a cable television system. Fiber deep (FD) may comprise a trend in which MSOs push fiber ever closer to customers to provide them with better service. In order to provide FD, many Data Over Cable Service Interface Specification (DOCSIS) compliant Hybrid Fiber-Coaxial (HFC) devices may be deployed onto an FD HFC network. These deployed devices may comprise, for example, Full Duplex (FDX) Remote PHY (RPD) nodes and FDX amplifiers. FDX RPD nodes and FDX amplifiers may amplify bi-directional full duplex traffic on the HFC that may share frequency spectrum in both an upstream (US) direction and a downstream (DS) direction on the HFC. Non FDX RPD nodes and Non FDX amplifiers may not share frequency spectrum.

Amplifiers (e.g., FDX amplifiers) may utilize coaxial cables on both an US side and a DS side. As opposed to FDX amplifiers, RPD nodes (e.g., FDX RPD) nodes may send and receive signals from an MSO headend via fiber optic cable on the US side rather than via coaxial cable, but may use coaxial cables on the DS side. Accordingly, FDX RPD nodes may be located at a junction of a fiber plant and a coaxial plant in the HFC network. Furthermore, FDX RPD nodes may include remote PHY circuitry that may implement the physical layer functionality that was conventionally perform at a Cable Modem Termination System (CMTS) located at the headend operated by the MSO.

Using current processes (e.g., DOCSIS 3.1 and FDX), an HFC network may deliver 10 Gbps DS and 5 Gbps US. Nevertheless, with 50% growth rate for high speed data in the HFC, 10 Gbps DS/5 Gbps US may soon fall short of market requirements because market requirements for HFC capacity may be doubled to 20 Gbps DS/10 Gbps US. One way to increase HFC capacity may be to extend its operation frequency range, for example, extending the operation frequencies in coax from 1.218 GHz to 3 GHz. 3 GHz spectrum should be able to support 20 Gbps DS/10 Gbps US. Embodiments of the disclosure may provide 3 GHz extended frequencies for an HFC network.

Figure 1B:
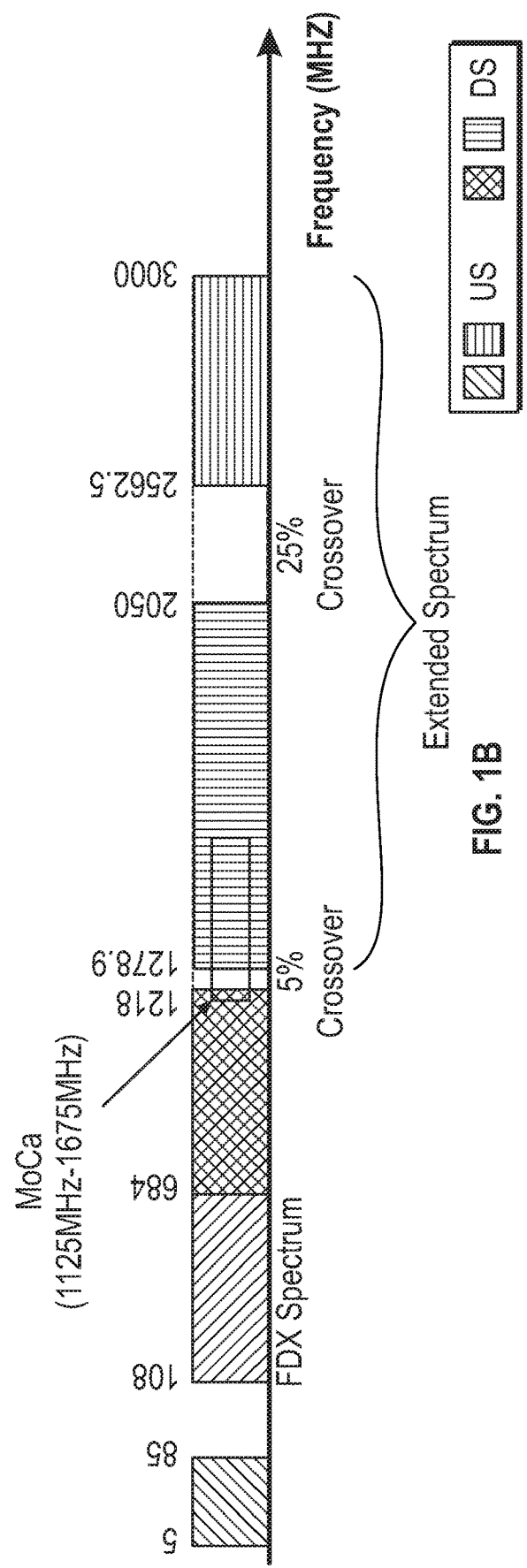

FIG. 1A and FIG. 1B show extended frequencies and DS/US spectrum partitioning. As shown in FIG. 1A and FIG. 1B, the operation frequency range of the coax network (e.g., HFC network) may be extended from 5 MHz-1.218 GHz to 5 MHz-3 GHz for example. FIG. 1A shows a partitioning plan in which the extended spectrum may be used for DS traffic. As shown in FIG. 1A, a 5% crossover band may be used between the extended spectrum and the legacy spectrum. FIG. 1B shows a partitioning plan in which the extended spectrum may be used for both DS and US traffic. As shown in FIG. 1B, a 5% crossover band may be used between the extended spectrum and the legacy spectrum and a 25% crossover may be used between the US portion and the DS portion of the extended spectrum. While a 5% and a 25% crossover are shown in FIG. 1A and FIG. 1B, these are examples and other guard bands may be used consistent with embodiments of the disclosure. Also, while FIG. 1A and FIG. 1B show 3 GHz as the high end of the extended frequency spectrum and 1.2789 GHz and the low end of the extended frequency spectrum, other values may be used and embodiments of the disclosure are not limited to these values.

Figure 2:
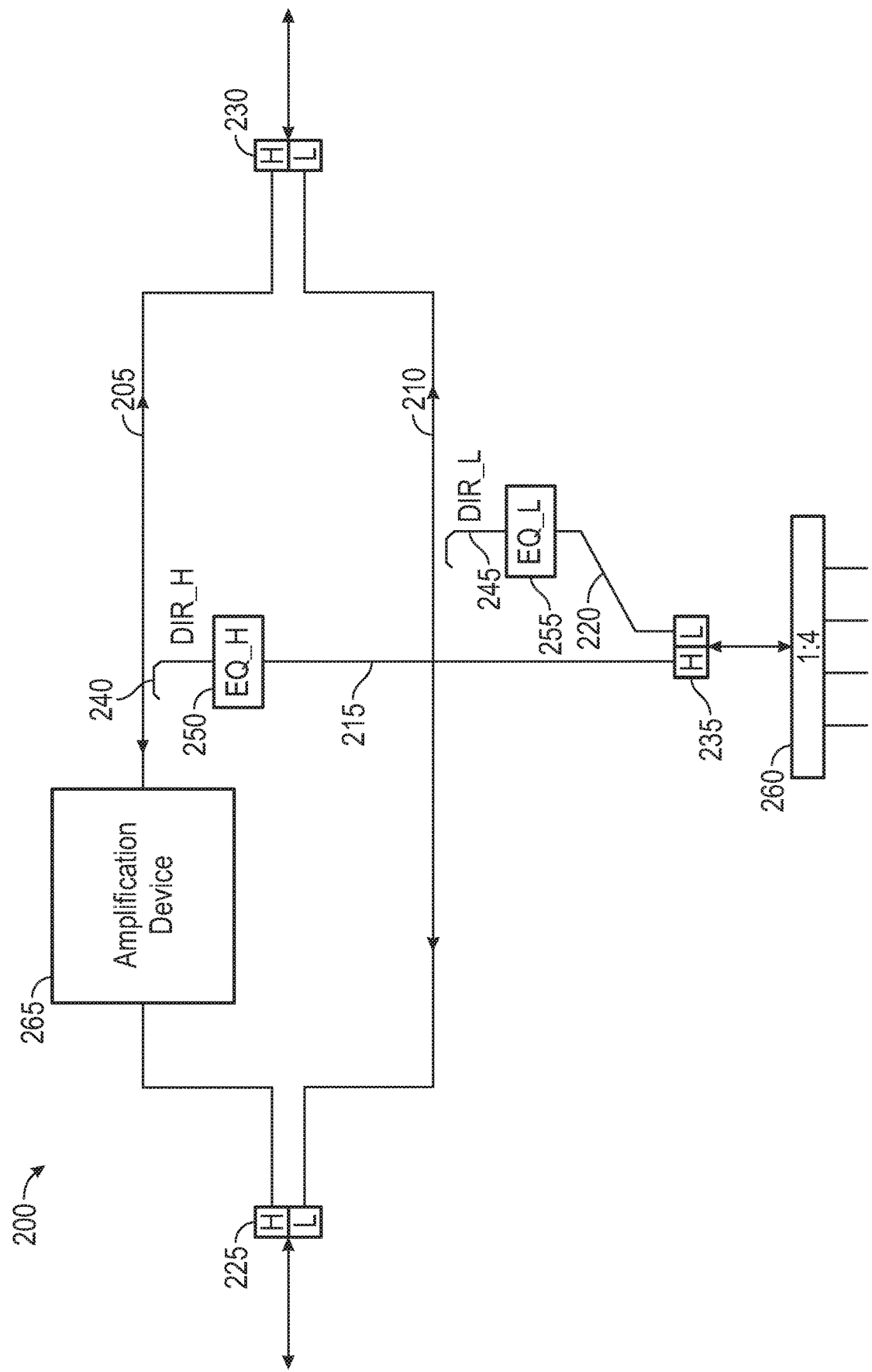
FIG. 2 is a block diagram of a hybrid active tap.

FIG. 2 shows a hybrid active tap 200 consistent with embodiments of the disclosure. As shown in FIG. 2, hybrid active tap 200 may comprise four branches: a first branch 205, a second branch 210, a third branch 215, and a fourth branch 220. In addition hybrid active tap 200 may comprise three diplexers: a first diplexer 225, a second diplexer 230, and a third diplexer 235. Two couplers may also be used by hybrid active tap 200 comprising a first coupler 240 and a second coupler 245. Hybrid active tap 200 may further comprise a first equalizer 250, a second equalizer 255, a splitter 260, and an amplification device 265.

As shown in FIG. 2, first branch 205 may be disposed between first diplexer 225 and second diplexer 230. First branch 205 may correspond to a first frequency spectrum. The first frequency spectrum may comprise, but is not limited to, the extended spectrum as described above with respect to FIG. 1A and FIG. 1B. Second branch 210 may be disposed between first diplexer 225 and second diplexer 230. Second branch 210 may correspond to a second frequency spectrum. The second frequency spectrum may comprise, but is not limited to, the legacy spectrum as described above with respect to FIG. 1A and FIG. 1B. Third branch 215 may be disposed between first coupler 240 and third diplexer 235. First coupler 240 may be coupled to first branch 205 and first equalizer 250 may be disposed in third branch 215. Fourth branch 220 may be disposed between second coupler 245 and third diplexer 235. Second coupler 245 may be coupled to second branch 210 and second equalizer 255 may be disposed in fourth branch 220. Splitter 260 may be connected to third diplexer 235 and amplification device 265 may be disposed in first branch 205.

Figure 3:
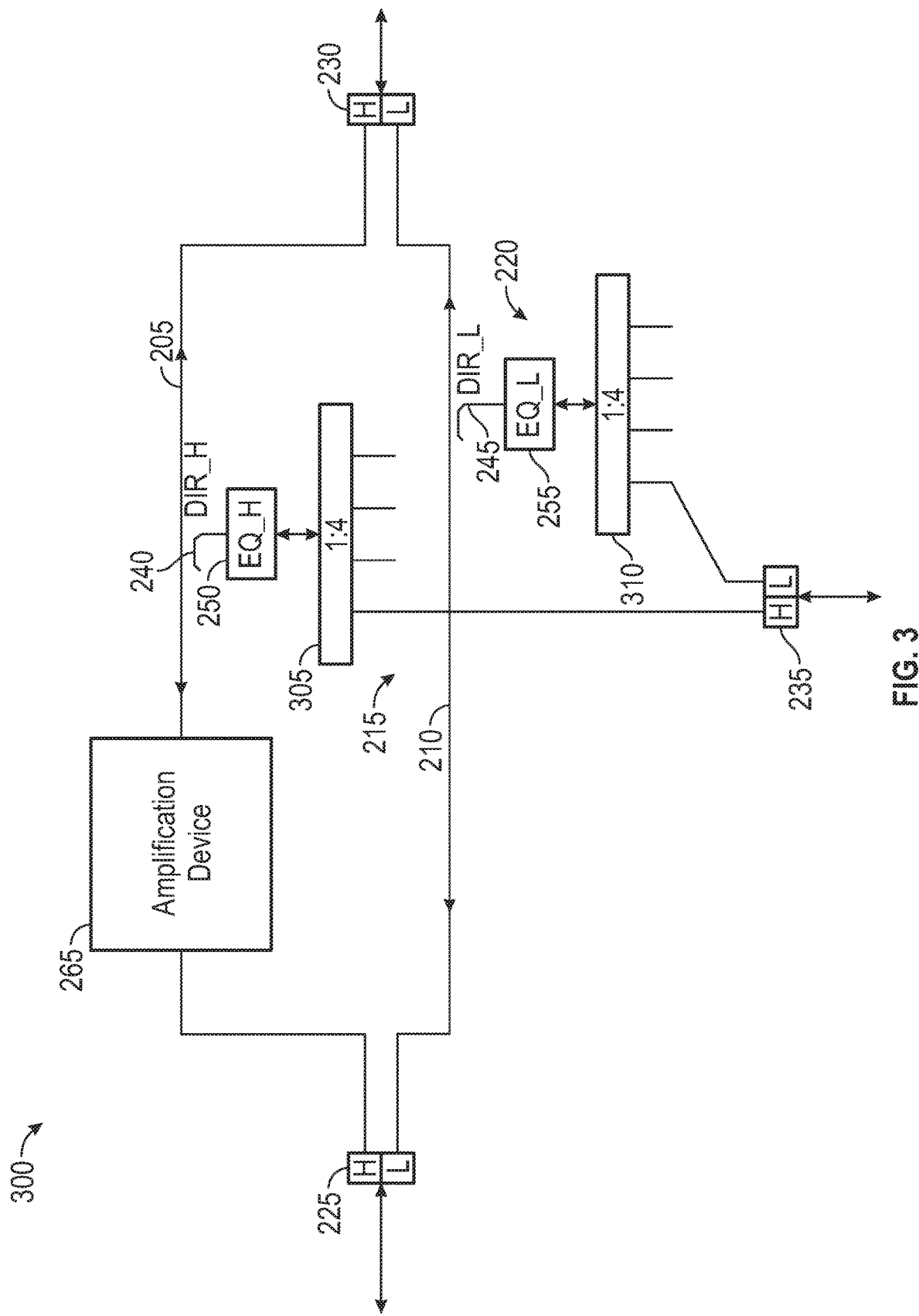
FIG. 3 is a block diagram of a hybrid active tap.

FIG. 3 shows a hybrid active tap 300 consistent with embodiments of the disclosure. Hybrid active tap 300 may be similar to hybrid active tap 200 of FIG. 2. In hybrid active tap 300, a first splitter 305 may be disposed in third branch 215 and a second splitter 310 may be disposed in fourth branch 220. Signals may be combined and then then split by hybrid active tap 200, in contrast with hybrid active tap 300, which may split and then combine.

Hybrid active tap 200 or hybrid active tap 300 may receive, at first diplexer 225, signals from an amplifier (e.g., an FDX amplifier), an RPD node (e.g., FDX RPD), or from another tap, and pass these received signals to another tap connected to second diplexer 230. The extended spectrum signals may be amplified by amplification device 265. Service drops connected to splitter 260 (e.g., for hybrid active tap 200) or third diplexer 235 (e.g., for hybrid active tap 300) may be used to provide service to homes for example.

Consistent with embodiments of the disclosure, hybrid active tap 200 or hybrid active tap 300, for example, may extend the operation frequency range of the coax network from 5 MHz-1.218 GHz to 5 MHz-3 GHz. By using amplification device 265, hybrid active tap 200 or hybrid active tap 300 may amplify signals (DS or DS/US) on the extended spectrum (e.g., 1.218 GHz to 3 GHz) in first branch 205, but may act as a passive tap for the signals (DS/US) on the legacy frequencies (e.g., 5 MHz-1.218 GHz) in second branch 210. While hybrid active tap 200 or hybrid active tap 300 may provide amplification in first branch 205 to overcome the extra path loss on the extended frequency spectrum, hybrid active tap 200 or hybrid active tap 300 may not impact the operations on the legacy frequencies (i.e., video, D3.0/D3.1, FDX), thus providing backward compatibility.

Elements of hybrid active tap 200 or hybrid active tap 300 (e.g., first diplexer 225, second diplexer 230, third diplexer 235, first coupler 240, second coupler 245, first equalizer 250, second equalizer 255, splitter 260, amplification device 265, first splitter 305, and second splitter 310) may be practiced in hardware and/or in software (including firmware, resident software, micro-code, etc.) or in any other circuits or systems. The elements of hybrid active tap 200 or hybrid active tap 300 may be practiced in electrical circuits comprising discrete electronic elements, packaged or integrated electronic chips containing logic gates, a circuit utilizing a microprocessor, or on a single chip containing electronic elements or microprocessors. Furthermore, the elements of hybrid active tap 200 or hybrid active tap 300 may also be practiced using other technologies capable of performing logical operations such as, for example, AND, OR, and NOT, including but not limited to, mechanical, optical, fluidic, and quantum technologies. As described in greater detail below with respect to FIG. 12, the elements of hybrid active tap 200 or hybrid active tap 300 may be practiced in a computing device 1200.

The diplexers (i.e., first diplexer 225, second diplexer 230, and third diplexer 235) in the hybrid active tap (i.e., hybrid active tap 200 or hybrid active tap 300) may separate the spectrum and direct the signals (both DS and US) on the extended frequencies to the top branch (i.e., first branch 205), where the signals may be amplified, and the signals on the legacy frequencies to the bottom branch (i.e., second branch 210) (both DS and US), which may act like a passive tap.

Figure 4:
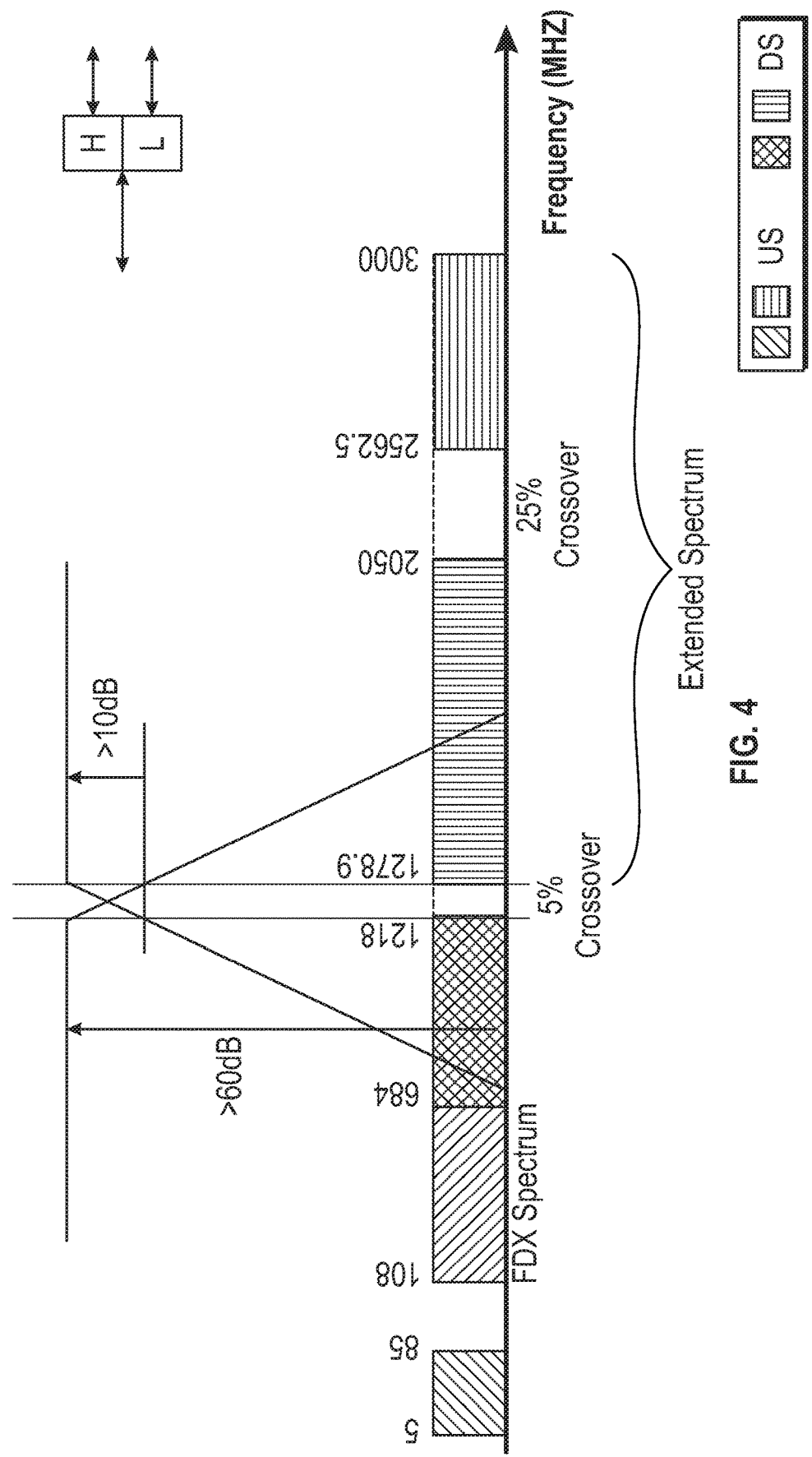
FIG. 4 illustrates diplexer requirements.

As shown in FIG. 4, a 10 dB rejection may be at the band edges, which may require a narrower crossover band between the legacy spectrum and the extended spectrum (i.e., 5% TBV). A greater than 60 dB rejection may be required for FDX US, and US in the extended spectrum if the spectrum partitioning of FIG. 1B is used.

The directions of the traffic is the same around 1218 MHz, but a diplexer is still needed for rejection for the far-off US spectrums, spectrum separation, and to suppress self-oscillation. Regarding rejection for the far-off US spectrums, greater than 60 dB rejection may be required for the US spectrums located in the legacy (FDX band) and the US in the top portion of the extended spectrum (spectrum partitioning of FIG. 1B).

Regarding spectrum separation, the diplexers (e.g., first diplexer 225, second diplexer 230, and third diplexer 235) may direct signals in the extended spectrum to the top branch (i.e., first branch 205) and signals in the legacy spectrum to the bottom branch (i.e., second branch 210). But signals around the cross over region may go through both branches, and combined again at the other end. For example, the majority of the signal at 1218 MHz may be directed to the bottom branch (i.e., second branch 210), but a small portion may leak into the top branch (i.e., first branch 205), amplified, and added back to the signal from the bottom branch (i.e., second branch 210) like a multipath component. To avoid the adverse effect of this "artificial multipath", 10 dB rejection may be required at the spectrum edges.

Regarding suppressing self-oscillation, the signal around the crossover region may be reflected back and bounced between the ports. To avoid self-oscillation, there should be enough loop gain suppression so the loop gain at any frequencies is negative. The majority of the loop gain suppression may come from the port isolations, which is around 20 dB. The gain of the amplifier for the extended spectrum may require only a few dB gain at the low end of the spectrum (e.g., 1278.9 MHz), and may increase with the frequency (i.e., up tilt). 10 dB rejection at 1278.9 MHz, plus the isolation between two ports of the diplexer (e.g., first diplexer 225, second diplexer 230, or third diplexer 235) may be sufficient to offset the gain of the amplifier and prevent the tap from self-oscillation.

With 10 dB rejection on band edges, a few percent (e.g., 5%) crossover band may be sufficient. The crossover band may be determined with the following factors: i) performance (10 dB rejection); ii) cost and manufacturability (the crossover band may need be wide enough for low cost design, and to accommodate the manufacture tolerance and temp shifting); and iii) spectrum overhead (the narrower the better).

Figure 5A:
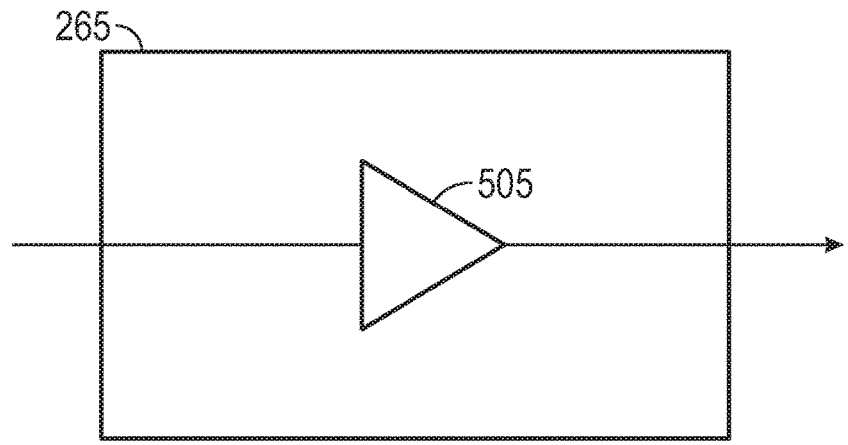
FIGS. 5A and 5B are block diagrams of an amplifier device.
Figure 5B:
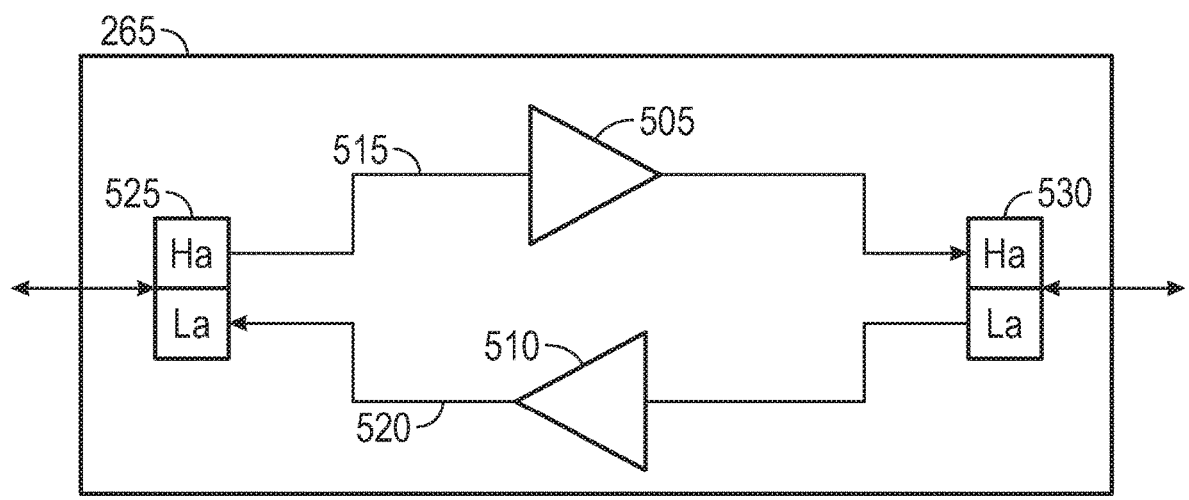

FIG. 5A and FIG. 5B show amplification device 265 in more detail. Amplification device 265 of FIG. 5A may be used in conjunction with the spectrum partitioning shown in FIG. 1A. Because, in embodiments of FIG. 1A, the extended spectrum may be used only for DS traffic, amplification device 265 of FIG. 5A may comprise a first amplifier 505 (e.g., a first gain block). First amplifier 505 may amplify signals in the DS direction in first branch 205.

Amplification device 265 of FIG. 5B may be used in conjunction with the spectrum partitioning shown in FIG. 1B. Because, in embodiments of FIG. 1B, the extended spectrum may be used for both DS and US traffic, amplification device 265 of FIG. 5B may comprise first amplifier 505 (e.g., the first gain block) and a second amplifier 510 (e.g., a second gain block). As shown in FIG. 5B, amplification device 265 may further comprise a fifth branch 515, a sixth branch 520, a fourth diplexer 525, and a fifth diplexer 530.

Fifth branch 515 may be disposed between fourth diplexer 525 and fifth diplexer 530. First amplifier 505 may be disposed in fifth branch 515. Fifth branch 515 may correspond to a third frequency spectrum within the first frequency spectrum. Third frequency spectrum may comprise that portion of the extended spectrum to which DS traffic is assigned.

Figure 6:
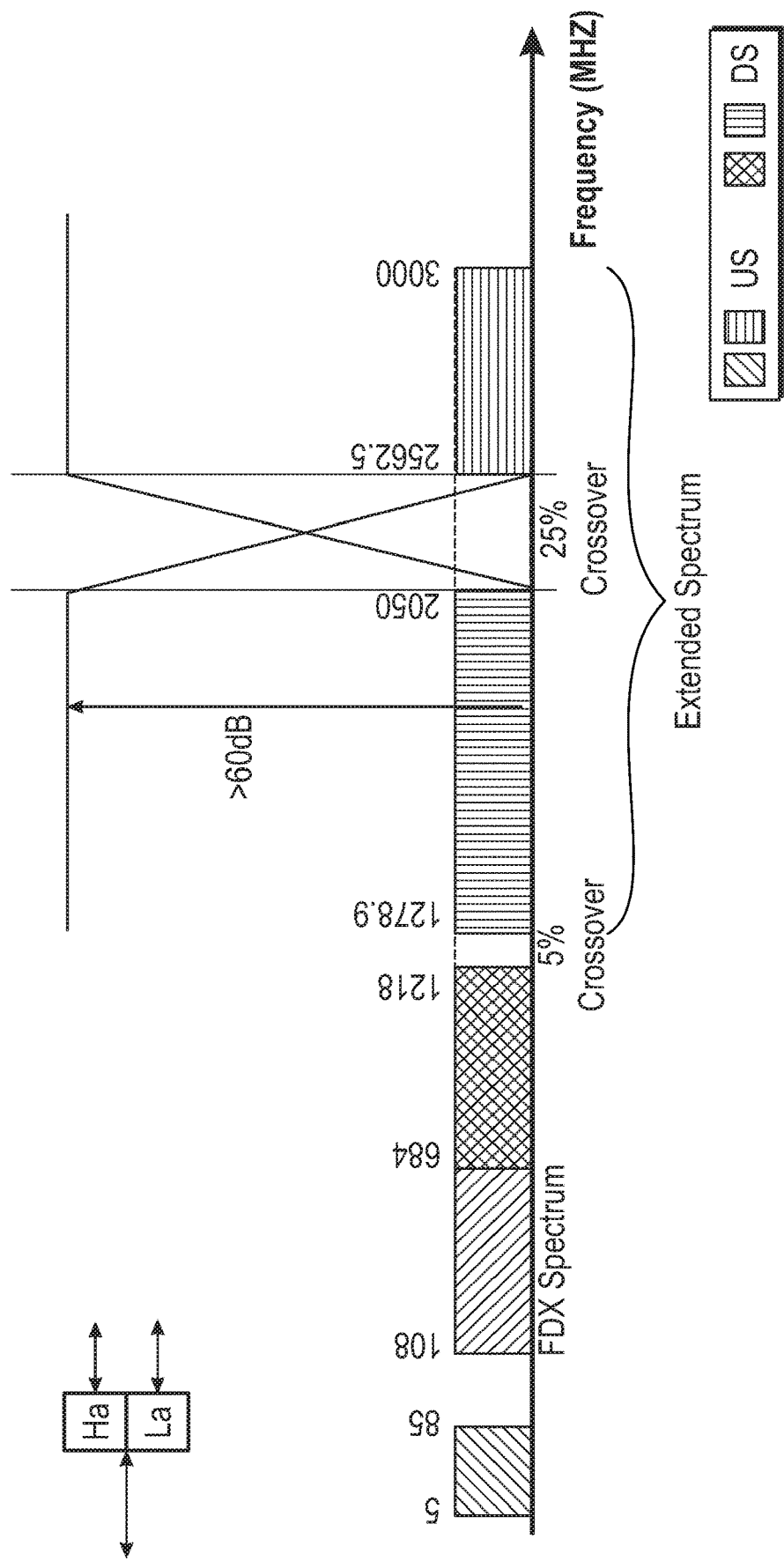
FIG. 6 illustrates amplifier diplexer requirement.

Sixth branch 520 may be disposed between fourth diplexer 525 and fifth diplexer 530. Second amplifier 510 may be disposed in sixth branch 520. Sixth branch 520 may correspond to a fourth frequency spectrum within the first frequency spectrum. Fourth frequency spectrum may comprise that portion of the extended spectrum to which US traffic is assigned. Fourth diplexer 525 and fifth diplexer 530 may separate DS and US on the extended frequency spectrum. First amplifier 505 may amplify signals in the DS direction in fifth branch 515 and second amplifier 510 may amplify signals in the US direction in sixth branch 520. FIG. 6 illustrates that the diplexers (i.e., fourth diplexer 525 and fifth diplexer 530) used in amplification device 265 of FIG. 5B may need to provide greater than 60 dB rejection.

Hybrid active tap 200 and hybrid active tap 300 may partition the spectrum into a legacy spectrum and an extended spectrum. Amplification device 265 may only need to cover the extended spectrum (e.g., from 1278.9 MHz to 3 GHz (actual coverage may be smaller, depending the frequency plan)). This may significantly reduce the complexity of the amplifier design. With proper system design (i.e., a few dB gain at the low end of the spectrum, and proper up tilt), the amplifier TCP may be limited to <65 dBmV. 65 dBmV corresponds to 0.04 W RF power (2 W AC, 2% efficiency). The completed design (amp+passive tap) may fit into an existing tap housing.

Hybrid active tap 200 and hybrid active tap 300 may contain two separated taps, one that covers the legacy spectrum and the other that covers the extended spectrum. This may significantly reduce the complexity of tap design with low cost and better performance. Moreover, two taps may be required, as the path loss/system link budgets may be different for legacy. With extended spectrums, two different tap values as well as two different equalizer values may be required. The size of the tap may be inversely proportional to the frequency, mechanically, it is very likely that the existing housing could accommodate both taps.

Embodiments of the disclosure may also include passive taps for extended frequencies. This may comprise hybrid active tap 200 and hybrid active tap 300 with amplification device 265 removed and a shunt put in its place. In a network with extended frequencies, not all the taps need be active. Most of the taps are still passive, hybrid active taps may be positioned at tap locations with larger intervals just to amplify the signal on the extended spectrum to compensate the extra pass loss on the high frequencies. Passive tap design with the extended frequency may still follow the same design of hybrid active tap 200 or hybrid active tap 300, but with amplification device 265 removed.

Figure 7A:
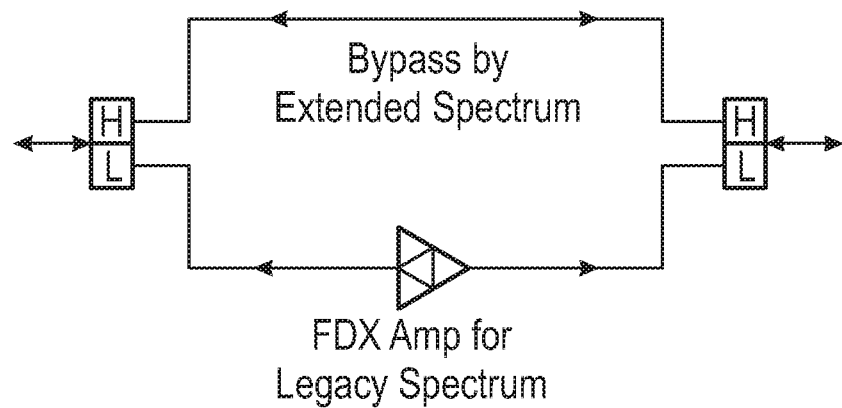
FIGS. 7A and 7B are block diagrams of hybrid active taps for extended frequencies for N+M.
Figure 7B:
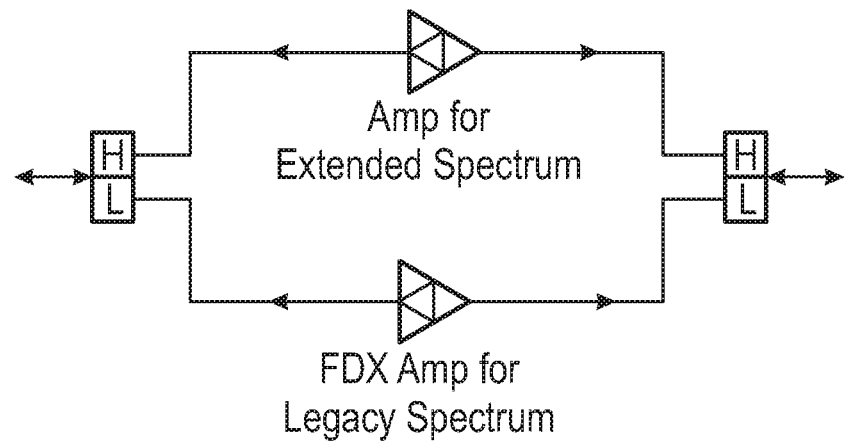

FIGS. 7A and 7B are block diagrams of hybrid active taps for extended frequencies for N+M. In order to support the extended frequencies in an N+M network, the existing FDX amp may need to be upgraded by adding: i) a bypass for extended spectrum (FIG. 7A); and ii) an amp for extended spectrum (FIG. 7B) if amplifiers are required for both the legacy and extended spectrum at the same tap location.

Splitting the spectrum into two separated segments may simplify tap and amplifier designs and may allow backward compatibility. Splitting the spectrum into two separated segments, with each segment running through separated taps with different tap/EQ values and RF gain, may effectively transform the network into two separated networks that can be engineered independently with different link budgets and requirements. Within a single tap house, the taps and amplifiers may be modularized and replaced/serviced independently. This may simplify the system design and reduce operational expenditure.

FIG. 8A and FIG. 8B show extended frequencies and DS/US spectrum partitioning. FIG. 8A shows a partitioning plan in which the extended spectrum may be used for DS traffic. FIG. 8B shows a partitioning plan in which the extended spectrum may be used for both DS and US traffic. FIG. 8A and FIG. 8B illustrate spectrum partitioning similar to that shown in FIG. 1A and FIG. 1B respectively, however, FIG. 8A and FIG. 8B may have cut over frequencies of 684 MHz-804 MHz.

The following describes reasons for lowering the cut over frequencies from 1218 MHz-1278.9 MHz (i.e., FIG. 1A and FIG. 1B) to 684 MHz-804 MHz (i.e., FIG. 8A and FIG. 8B). 684 MHz-804 MHz may comprise the crossover region of a Cable Modem (CM) FDX diplexer, where the FDX CM has degraded performance (e.g., the FDX CM may not be able to use this region at all). Using this region as the crossover guard band may minimize the spectrum overhead. In addition, reducing the legacy spectrum to 108 MHz-684 MHz may reduce the power consumption of legacy system. The power consumption of the extended spectrum (804 MHz-3 GHz) may be low as well due to short intervals of active devices. The total power consumption of the legacy (108 MHz-684 MHz) and extended spectrum (804 MHz-3 GHz) may be lower compared to the original system (108 MHz-1218 MHz).

Figure 9:
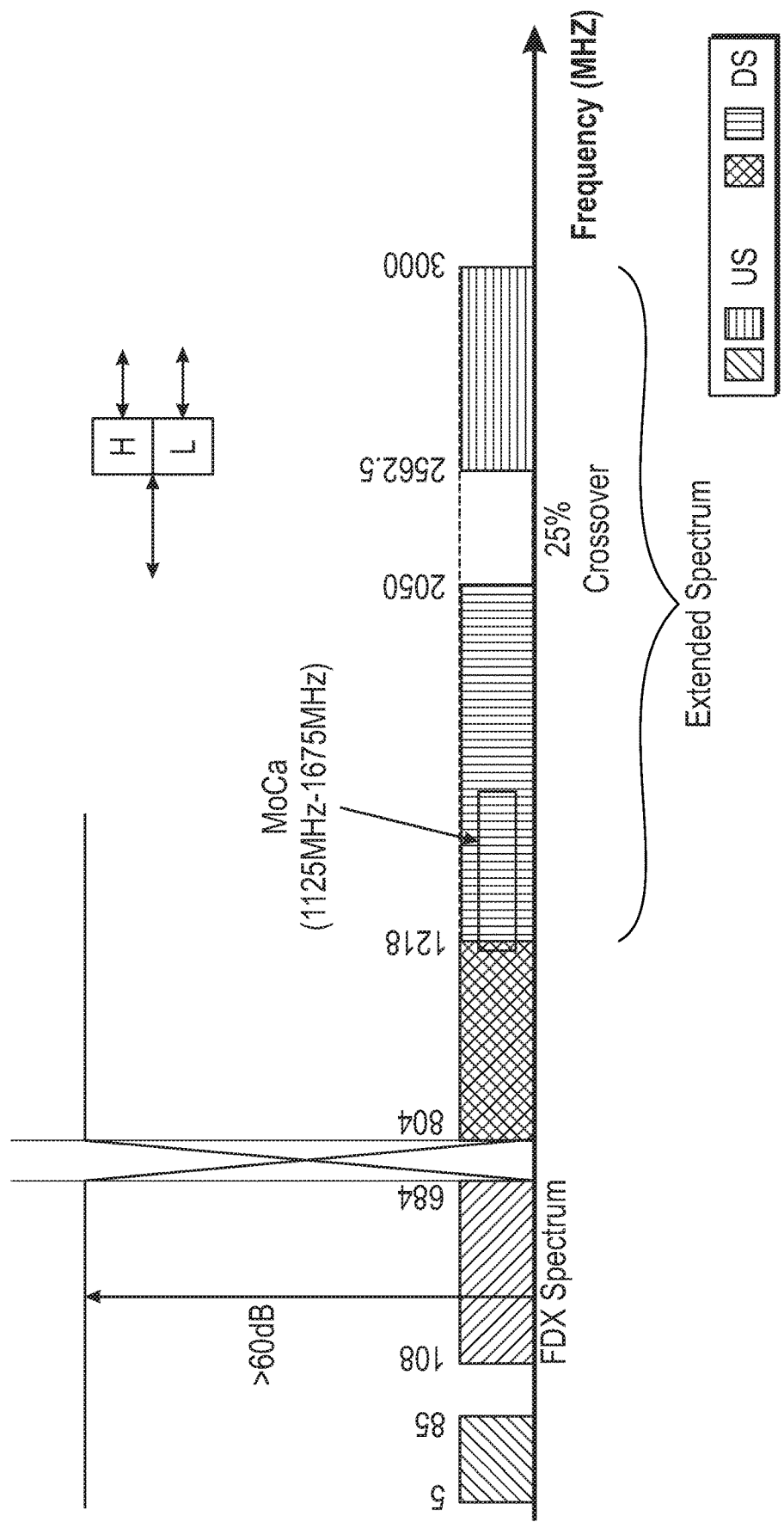
FIG. 9 illustrates diplexer requirements.

FIG. 9 illustrates diplexer (e.g., first diplexer 225, second diplexer 230, and third diplexer 235) requirements for the extended frequencies and DS/US spectrum partitioning of FIG. 8A and FIG. 8B. As shown in FIG. 9, greater than 60 dB rejection may be required on the cross over band edges.

Figure 10:
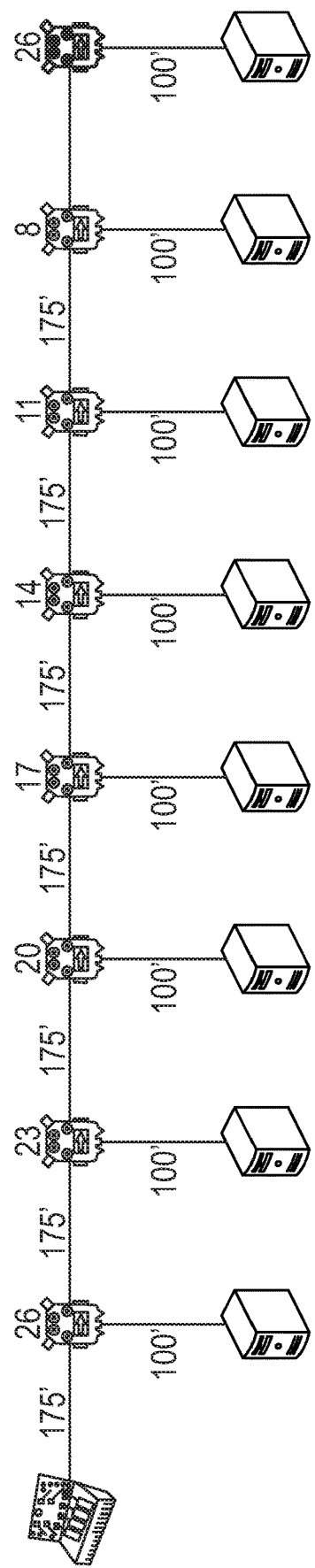
FIG. 10 illustrates a network model for power calculation.

FIG. 10 illustrates a network model for power calculation. A "worst" model may be used for power consumption calculation: i) length of truck cable (PIII):175 ft; ii) length of drop cable (RG6):100 ft; and iii) tap values and insertion losses may be per tap specs (e.g., the insertion losses at 3 GHz may be estimated based on prototypes). The link budget may be computed for the upper edge of the spectrum: i) assume an amplifier interval (number of taps between active devices); ii) compute the path loss between amplifier and CM; iii) compute the required amplifier output power density to meet CM minimum received level (−8 dBmV/6 MHz); and iv) compute the power consumption of each amplifier, given its output power density at the upper edge of the spectrum, spectrum BW, and the required up tilt.

The total power consumption may be determined as follows: i) assume node size=200 HHP, and 2.4 HHP per tap on average; ii) determine the number of active devices (amplifiers) required, given the conditions above; and iii) the total power consumption is obtained by summing up the powers of all the amplifiers. FIG. 11 shown a comparison on AC power for 200 HHP (N+2).

Figure 12:
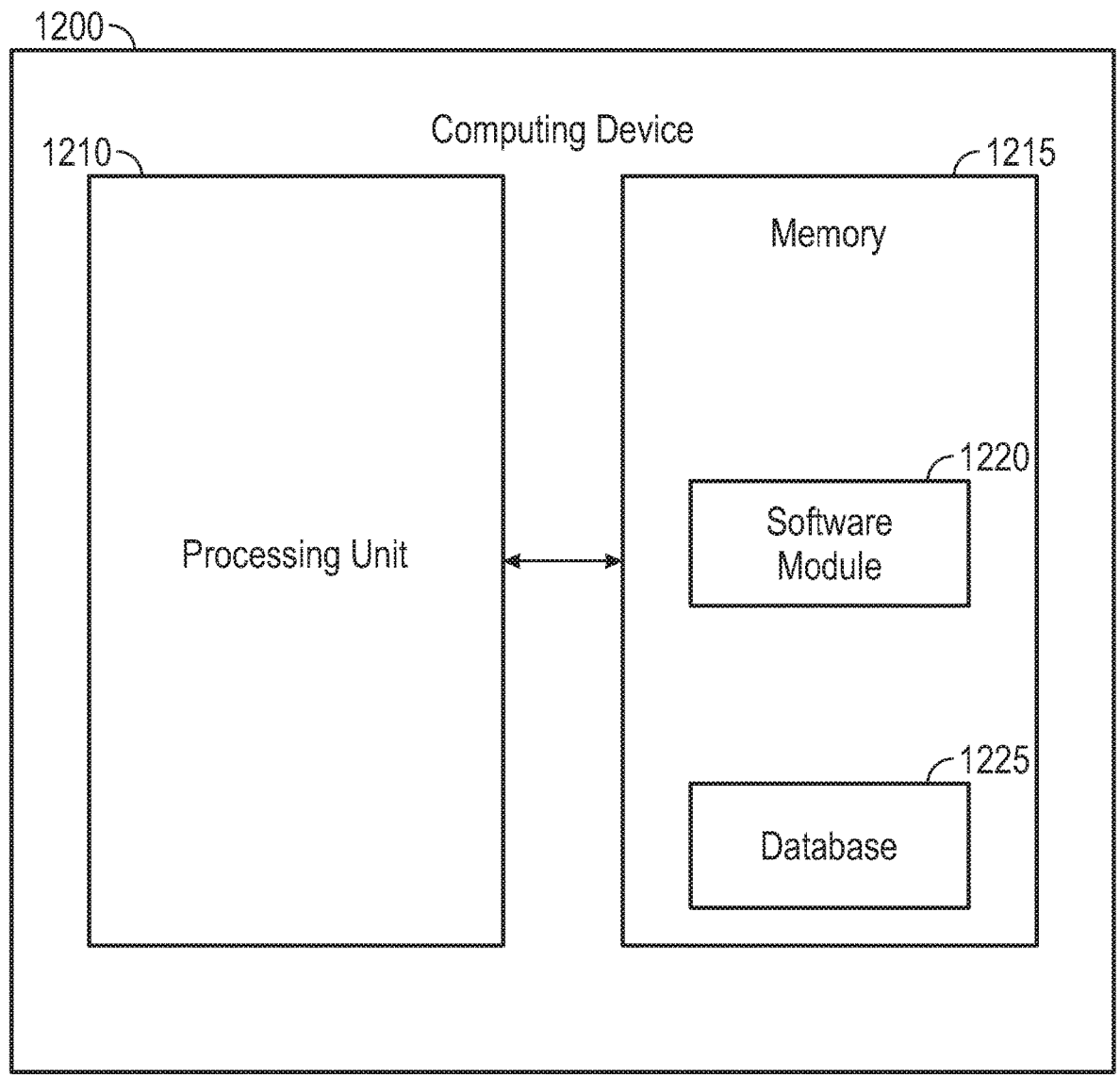
FIG. 12 is a block diagram of a computing device.

FIG. 12 shows computing device 1200. As shown in FIG. 12, computing device 1200 may include a processing unit 1210 and a memory unit 1215. Memory unit 1215 may include a software module 1220 and a database 1225. While executing on processing unit 1210, software module 1220 may perform, for example, processes for providing a hybrid active tap as described above. Computing device 1200, for example, may provide an operating environment for first diplexer 225, second diplexer 230, third diplexer 235, first coupler 240, second coupler 245, first equalizer 250, second equalizer 255, splitter 260, amplification device 265, first splitter 305, and second splitter 310. First diplexer 225, second diplexer 230, third diplexer 235, first coupler 240, second coupler 245, first equalizer 250, second equalizer 255, splitter 260, amplification device 265, first splitter 305, and second splitter 310 may operate in other environments and are not limited to computing device 1200.

Computing device 1200 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 1200 may comprise any computer operating environment, such as hand-held devices, multiprocessor systems, microprocessor-based or programmable sender electronic devices, minicomputers, mainframe computers, and the like. Computing device 1200 may also be practiced in distributed computing environments where tasks are performed by remote processing devices. The aforementioned systems and devices are examples and computing device 1200 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 and FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 1200 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Embodiments of the present disclosure, for example, are described above with reference to the low and upper edges of the frequencies for the cross over bands and the 3 GHz upper edge of the extended spectrum. These frequencies are used for the purpose of the illustrations only. The embodiments of the present disclosure can be applied to the cases with different frequencies, for example, the upper edge of the extended spectrum is 1.8 GHz.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a first branch disposed between a first diplexer and a second diplexer, the first branch corresponding to a first frequency spectrum;
   a second branch disposed between the first diplexer and the second diplexer, the second branch corresponding to a second frequency spectrum;
   a third branch disposed between a first coupler and a third diplexer, the first coupler being coupled to the first branch;
   a fourth branch disposed between a second coupler and the third diplexer, the second coupler being coupled to the second branch;
   a splitter connected to the third diplexer; and
   an amplification device disposed in the first branch.

2. The apparatus of claim 1, wherein the amplification device comprises a first amplifier configured to amplify signals in a Downstream (DS) direction.

3. The apparatus of claim 2, wherein the amplification device further comprises:
   a fifth branch disposed between a fourth diplexer and a fifth diplexer, the fifth branch corresponding to a third frequency spectrum within the first frequency spectrum wherein the first amplifier is disposed in the fifth branch; and
   a sixth branch disposed between the fourth diplexer and the fifth diplexer, the sixth branch corresponding to a fourth frequency spectrum within the second frequency spectrum wherein a second amplifier configured to amplify signals in an Upstream (US) direction is disposed in the sixth branch.

4. The apparatus of claim 1, wherein the first frequency spectrum is greater than the second frequency spectrum.

5. The apparatus of claim 1, wherein the first branch carries signals in both an Upstream (US) direction and a Downstream (DS) direction.

6. The apparatus of claim 1, wherein the first branch carries signals in only a Downstream (DS) direction.

7. The apparatus of claim 1, wherein the apparatus comprises a tap in a Hybrid Fiber-Coaxial (HFC) network.

8. An apparatus comprising:
   a first branch disposed between a first diplexer and a second diplexer, the first branch corresponding to a first frequency spectrum;
   a second branch disposed between the first diplexer and the second diplexer, the second branch corresponding to a second frequency spectrum;
   a third branch disposed between a first coupler and a third diplexer, the first coupler being coupled to the first branch and wherein a first splitter is disposed in the third branch;
   a fourth branch disposed between a second coupler and the third diplexer, the second coupler being coupled to the second branch and wherein a second splitter is disposed in the fourth branch; and
   an amplification device disposed in the first branch.

9. The apparatus of claim 8, wherein the amplification device comprises a first amplifier configured to amplify signals in a Downstream (DS) direction.

10. The apparatus of claim 9, wherein the amplification device further comprises:
    a fifth branch disposed between a fourth diplexer and a fifth diplexer, the fifth branch corresponding to a third frequency spectrum within the first frequency spectrum wherein the first amplifier is disposed in the fifth branch; and
    a sixth branch disposed between the fourth diplexer and the fifth diplexer, the sixth branch corresponding to a fourth frequency spectrum within the second frequency spectrum wherein a second amplifier configured to amplify signals in an Upstream (US) direction is disposed in the sixth branch.

11. The apparatus of claim 8, wherein the first frequency spectrum is greater than the second frequency spectrum.

12. The apparatus of claim 8, wherein the first branch carries signals in both an Upstream (US) direction and a Downstream (DS) direction.

13. The apparatus of claim 8, wherein the first branch carries signals in only a Downstream (DS) direction.

14. The apparatus of claim 8, wherein the apparatus comprises a tap in a Hybrid Fiber-Coaxial (HFC) network.

15. An apparatus comprising:
    a first branch disposed between a first diplexer and a second diplexer, the first branch corresponding to a first frequency spectrum;
    a second branch disposed between the first diplexer and the second diplexer, the second branch corresponding to a second frequency spectrum;
    a third branch disposed between a first coupler and a third diplexer, the first coupler being coupled to the first branch; and a fourth branch disposed between a second coupler and the third diplexer, the second coupler being coupled to the second branch.

16. The apparatus of claim 15, further comprising a splitter connected to the third diplexer.

17. The apparatus of claim 15, further comprising:
a first splitter disposed in the third branch; and
a second splitter disposed in the fourth branch.

18. The apparatus of claim 15, wherein first frequency spectrum is greater than the second frequency spectrum.

19. The apparatus of claim 15, wherein the first branch carries signals in both an Upstream (US) direction and a Downstream (DS) direction.

20. The apparatus of claim 15, wherein the first branch carries signals in only a Downstream (DS) direction.

* * * * *